(12) United States Patent
Robinson et al.

(10) Patent No.: US 7,677,096 B2
(45) Date of Patent: Mar. 16, 2010

(54) LANDING GEAR GROUND TEST

(75) Inventors: Guy Robinson, Bristol (GB); Fraser F L Wilson, Bristol (GB)

(73) Assignee: Airbus Operations Limited, Bristol (GB)

( * ) Notice: Subject to any disclaimer, the term of this patent is extended or adjusted under 35 U.S.C. 154(b) by 348 days.

(21) Appl. No.: 11/797,272

(22) Filed: May 2, 2007

(65) Prior Publication Data

US 2007/0257150 A1 Nov. 8, 2007

(30) Foreign Application Priority Data

May 3, 2006 (GB) .................................. 0608744.9

(51) Int. Cl.
*G01P 13/00* (2006.01)
(52) U.S. Cl. .................................. 73/170.02
(58) Field of Classification Search .............. None
See application file for complete search history.

(56) References Cited

U.S. PATENT DOCUMENTS 3,696,663 A * 10/1972 Klinger ................... 73/794
4,889,202 A * 12/1989 Bron ....................... 177/134
4,953,391 A  9/1990 Schober et al.
6,619,127 B2 * 9/2003 Miller et al. ............. 73/663
7,058,488 B2 * 6/2006 Kemp et al. .............. 701/33
2007/0032931 A1 * 2/2007 Makinadjian ............ 701/37

FOREIGN PATENT DOCUMENTS

| EP | 0 145 057 | 6/1985 |
| EP | 1 122 531 | 8/2001 |
| SU | 502274 A * | 4/1976 |
| SU | 913070 | 3/1982 |
| SU | 1027567 | 7/1983 |
| SU | 1107026 | 8/1984 |

OTHER PUBLICATIONS

UK Search Report for GB 0608744.9, date of search: Aug. 11, 2006.

* cited by examiner

*Primary Examiner*—Lisa M Caputo
*Assistant Examiner*—Jermaine Jenkins
(74) *Attorney, Agent, or Firm*—Nixon & Vanderhye P.C.

(57) ABSTRACT

A method of applying a test load to a landing gear mounted on an aircraft, the method comprising parking the aircraft with at least one tire of the landing gear on a platform; and moving the platform so as to apply the test load to the landing gear via the tire. An array of six platforms is mounted on a sliding chassis in a recessed oil bath. The platforms can be independently rotated to apply torque. The spacing between the platforms can be adjusted to adapt for different landing gear configurations.

30 Claims, 10 Drawing Sheets

US 7,677,096 B2

LANDING GEAR GROUND TEST

FIELD OF THE INVENTION

The present invention relates to a method and apparatus for applying a test load to a landing gear mounted on an aircraft.

BACKGROUND OF THE INVENTION

Conventional methods of applying a test load to a landing gear of an aircraft involve placing the whole landing gear, or a component thereof, in a test rig.

Such test rigs can be complex and can fail to accurately re-create the conditions of a landing gear in service on an aircraft.

SUMMARY OF THE INVENTION

A first aspect of the invention provides a method of applying a test load to a landing gear mounted on an aircraft, the method comprising parking the aircraft with at least one tire of the landing gear on a platform; and moving the platform so as to apply the test load to the landing gear via the tire.

A second aspect of the invention provides apparatus for applying a test load to a landing gear mounted on an aircraft, the apparatus comprising one or more platforms for engaging one or more tires of the landing gear, and one or more platform actuators for moving the platform(s) so as to apply the test load to the landing gear via the tire.

The invention provides a method (and associated apparatus) for applying a test load to a landing gear which is mounted on an aircraft, thus re-creating the service conditions of the landing gear, including the tire.

The platform is typically held substantially stationary after it has been moved, so as to apply a substantially static load to the landing gear.

Preferably the movement of the platform includes at least a component of rotation about an axis substantially normal to the platform (typically a vertical axis), so as to apply an element of torque to the tire. This enables the platform to simulate certain loading situations such as self-aligning torque. A component of linear load may also be applied to the tire, in horizontal and/or vertical directions.

All tires of the landing gear may be parked on a single platform, but preferably the method comprises parking two or more tires of the landing gear on different platforms; and moving the platforms relative to each other. For instance the platforms may be moved in different directions, or may be moved in the same direction but at different rates.

Where more than one platform is provided, then a gap between the platforms is typically filled with a bridge which can be removed after the tires have been rolled onto the platforms.

Load in the platform (or platforms) and in the landing gear is typically measured and recorded during the application of load to the landing gear.

Typically the platform (or platforms) is moved in accordance with a pre-stored loading sequence.

Typically the platform is driven by a platform actuator which is housed in a recess below a support surface.

In a preferred embodiment the platforms can be moved relative to each other when no aircraft is parked on the platforms, so as to vary the spacing between the platforms. Also one or more of the platforms can be removed so as to vary the number of platforms. This modular arrangement enables the pitch between platforms and/or the number of platforms to be adjusted to accommodate different landing gears.

BRIEF DESCRIPTION OF THE DRAWINGS

Embodiments of the invention will now be described with reference to the accompanying drawings, in which.

DETAILED DESCRIPTION OF EMBODIMENTS

Figure 2:
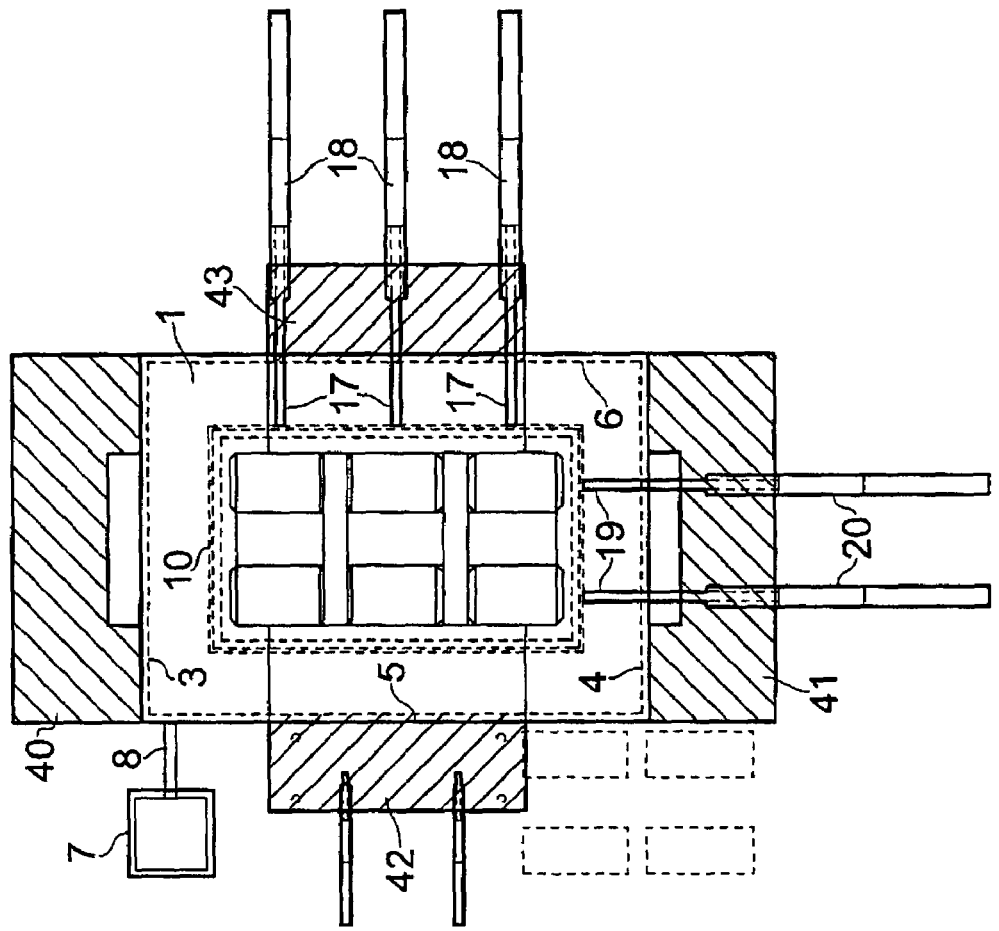
FIG. 2 is a plan view of the calibration fixture with the covers open.

The calibration fixture shown in the figures comprises an oil bath 1 which is recessed below a support surface 2 shown in FIGS. 5 and 7, and has front and rear walls 3,4 and left and right side walls 5,6 shown most clearly in FIG. 2. The oil bath 1 communicates with a sump 7 via a channel 8. The fixture may be installed inside a hangar (in which case the support surface 2 is the floor of the hangar) or may be installed in an external testing area of an airfield.

Figure 3:
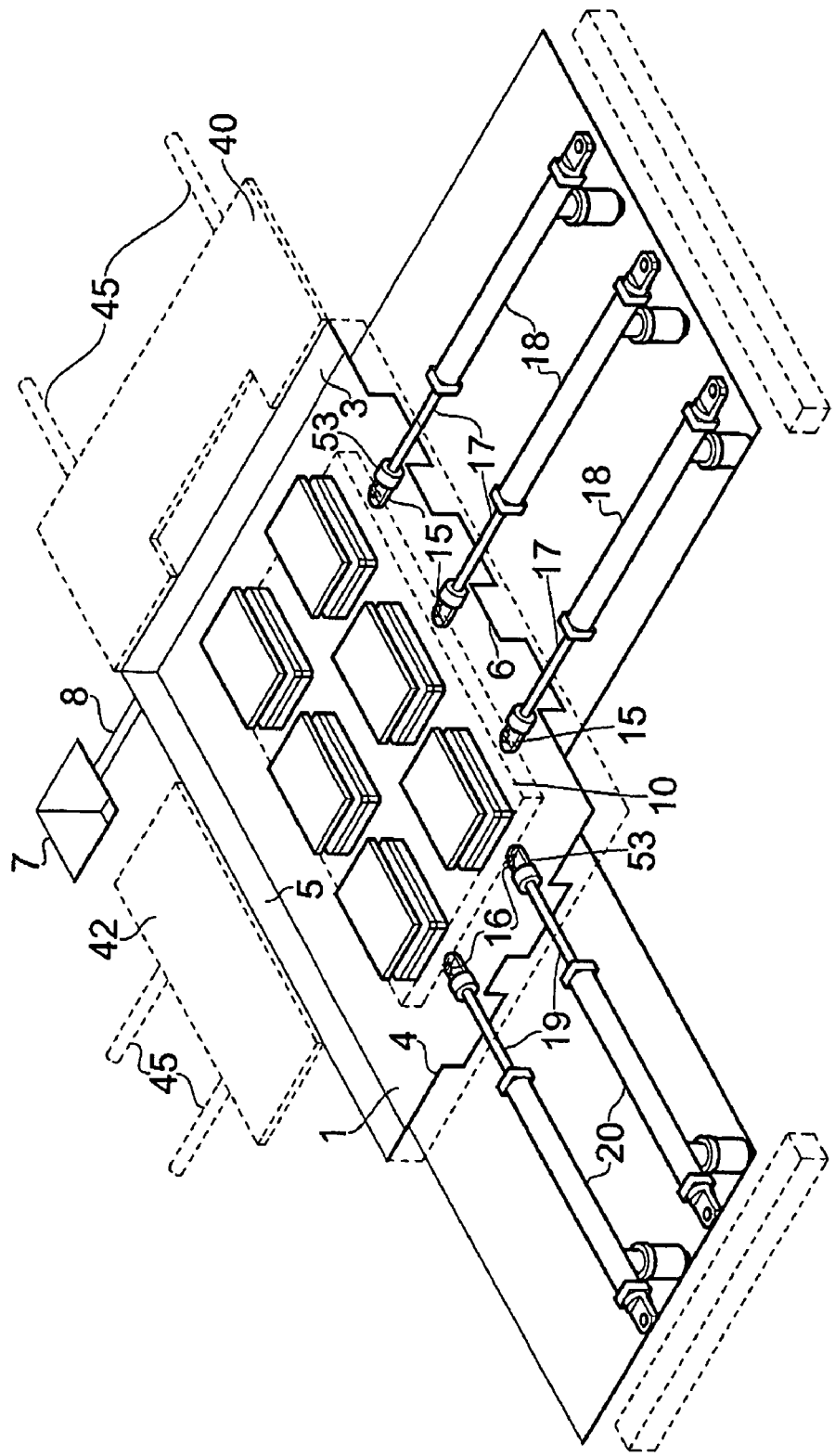
FIG. 3 is an isometric view of the calibration fixture with two of the covers open, and two of the covers not shown.

Housed in the oil bath is a chassis 10 (shown in dotted lines in FIGS. 2 and 3) and an array of six pads 11 mounted on the chassis. The pads 11 are modular items which can be moved in relation to the chassis, in order to vary the spacing between the pads and adapt the fixture for landing gears with different spacing between the wheels. The pads can also be removed in order to adapt the fixture for landing gears with different numbers of wheels. This modular construction can be achieved in a number of ways. In this case the upper surface of the chassis has a square array of closely spaced holes 26 shown in FIG. 4a, and the lower surface of the pads has pegs (not shown) which push-fit into the holes 26.

The chassis 10 has three lugs 15 arranged along its right edge, and two lugs 16 along its lower edge. The lugs 15 are attached to piston rods 17 of Y-load application actuators 18, and the lugs 16 are attached to piston rods 19 of X-load application actuators 20. The X and Y-load application actuators can each be driven independently to generate a desired translational and/or rotational movement of the chassis 10.

Figure 4A:
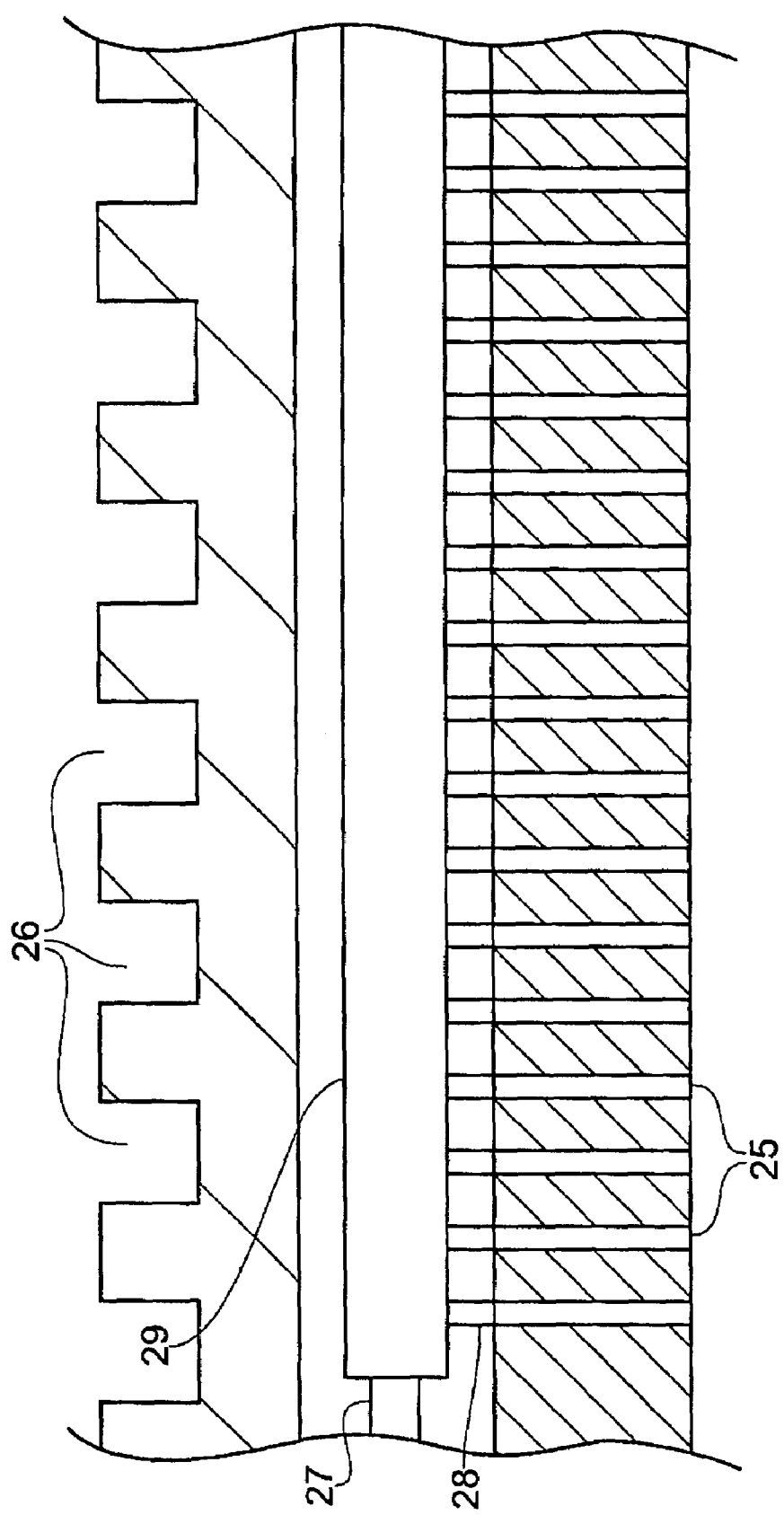
FIG. 4a is a schematic cross-section through the chassis
Figure 4B:
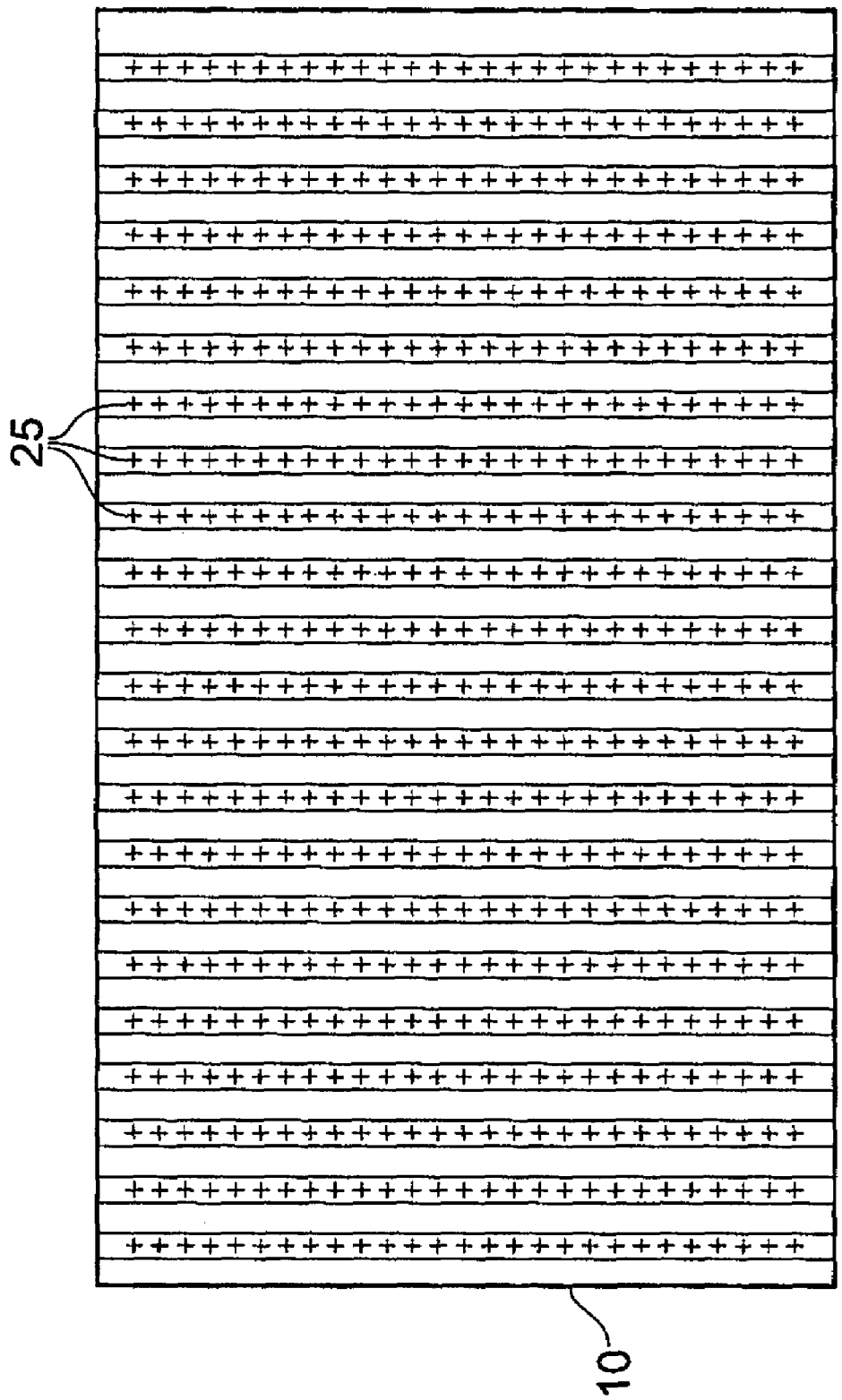
FIG. 4b is a view of the underside of the chassis.

The chassis 10 is mounted on a hydrostatic film bearing shown in FIGS. 4a and 4b. Oil is pumped from the sump 7 by a pump (not shown) through an umbilical 27 (not shown in FIGS. 1-3). As shown in FIG. 4a, the chassis 10 has an upper plate carrying the holes 26, and a lower plate carrying an array of equally spaced channels 25, each channel 25 being indicated by a cross in the underside view of FIG. 4b. Oil from the umbilical 27 is distributed to an array of hoses 28 by a manifold 29, each hose 28 communicating with a respective one of the channels 25 in the lower plate Thus oil is continuously pumped through the channels 27 to form a low friction hydrostatic film bearing.

Figure 5:
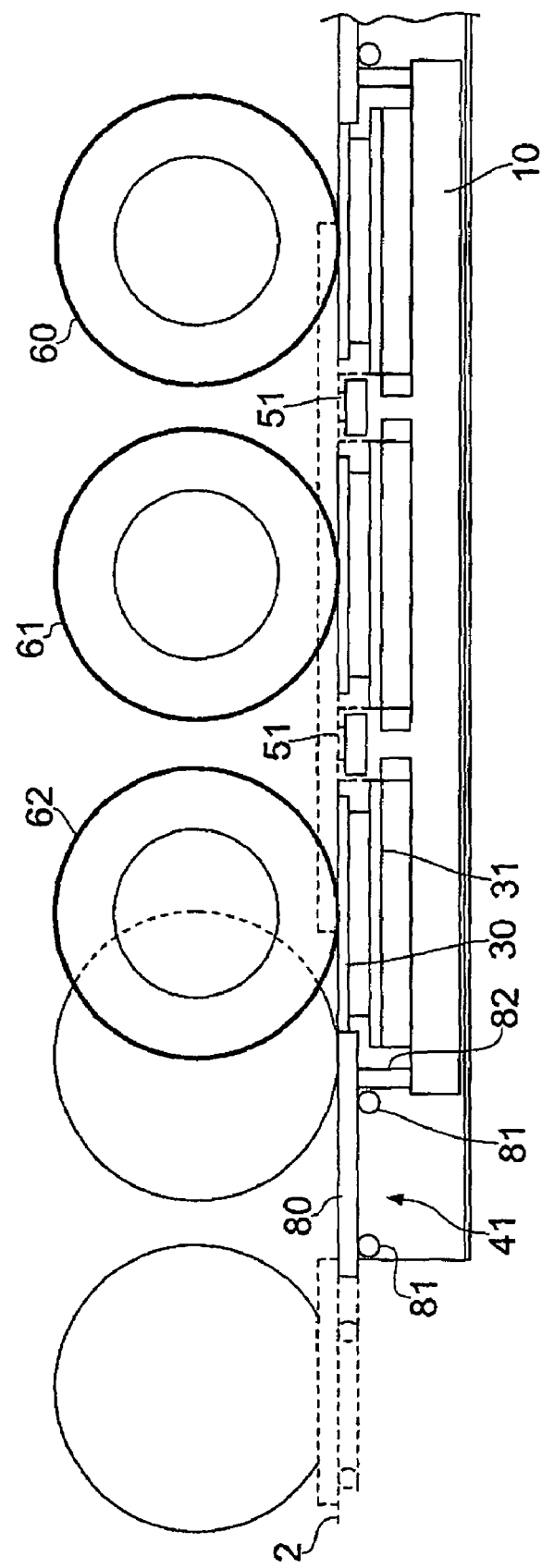
FIG. 5 is a cross-sectional view taken from a side of the calibration fixture, showing a landing gear being parked onto the fixture.
Figure 6:
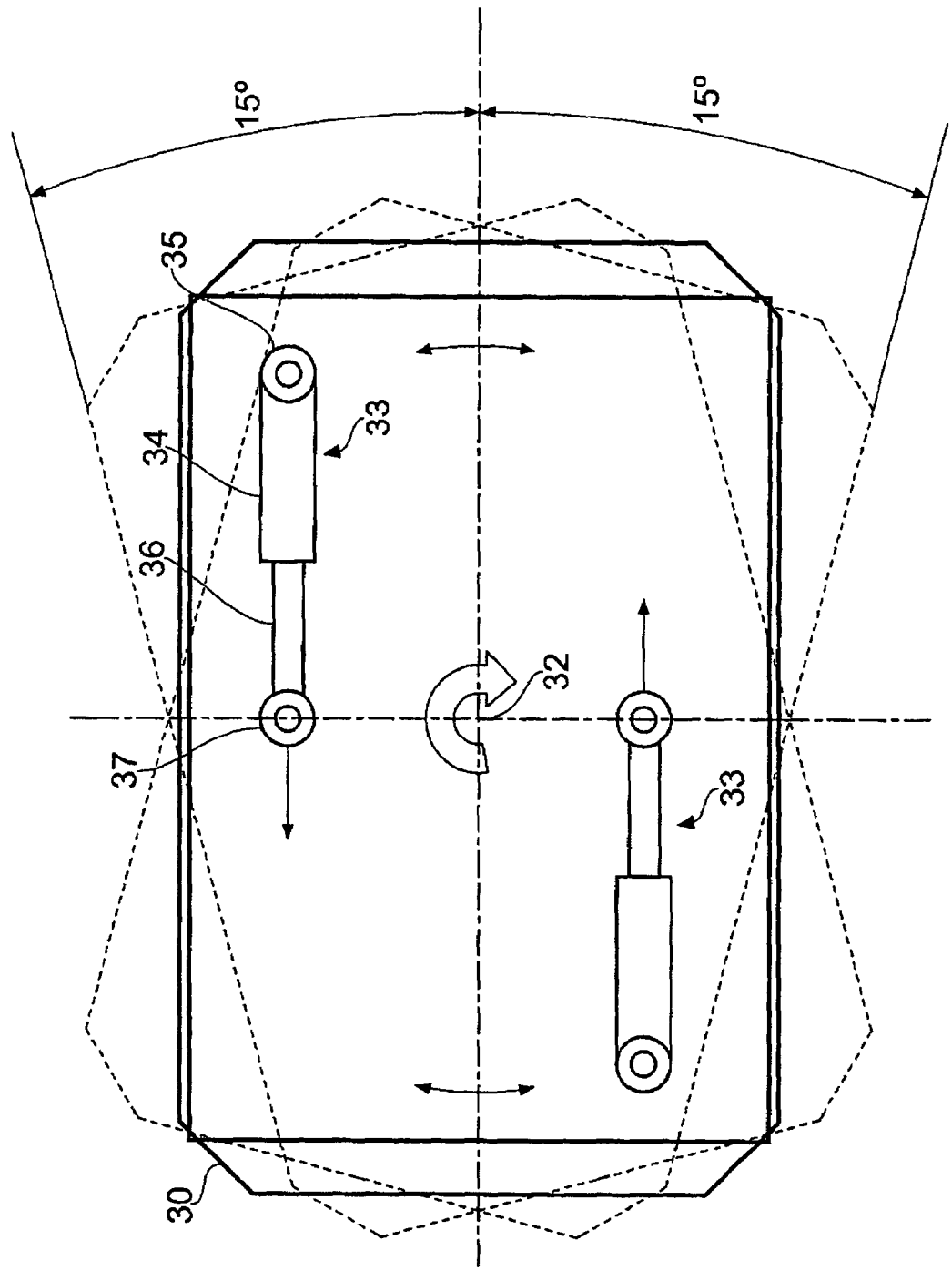
FIG. 6 is a schematic plan view of one of the pads showing the pad actuators.

Referring to FIG. 5, each pad 11 comprises a wheel platform 30 mounted on a pedestal 31 via a thrust bearing (not shown). The platform 30 is rotated about a vertical axis 32 through the centre of the pad by a torque actuation mechanism shown schematically in FIG. 6. The torque actuation mechanism comprises a pair of linear actuators 33 which are located on opposite sides of the axis 32 and configured to apply load to the platform in opposite directions. Each actuator 33 comprises a hydraulic cylinder 34 with a pivot 35 attached to the pedestal 31, and a piston rod 36 with a pivot 37 at its end attached to the underside of the wheel platform 30. These actuators provide plus or minus 15 degree movement, as shown in FIG. 6.

Referring back to FIGS. 1 and 2, the calibration fixture comprises front and rear covers 40,41 and left and right covers 42,43. Each cover is attached to a pair of cover rods 45 which are driven by cover actuator pistons 46, shown most clearly in FIG. 1. Note that the cover rods and pistons for the front, right and rear covers are omitted from FIG. 1 for clarity, and the rear and right covers are omitted from FIG. 3 for clarity.

FIG. 5 shows the rear cover 41 in detail. The front cover 40 is identical. The rear cover 41 comprises a plate 80 carrying a set of wheels 81. The chassis 10 has a support wall 82, and when the cover is in its closed position (shown in solid lines in FIG. 5) the underside of the plate 80 is supported by the wall 82, and the front edge of the plate abuts the pad 30. Thus the cover 41 can support the weight of the wheels rolling over it during parking. When the aircraft has been parked, the cover 41 is retracted to its open position shown in dashed lines in FIG. 5. The wheels 81 run on tracks (not shown) which are recessed below the support surface 2 and have an angled ramp so that as the cover rods 45 are retracted, the wheels 81 roll up the ramp to the open position.

Figure 7:
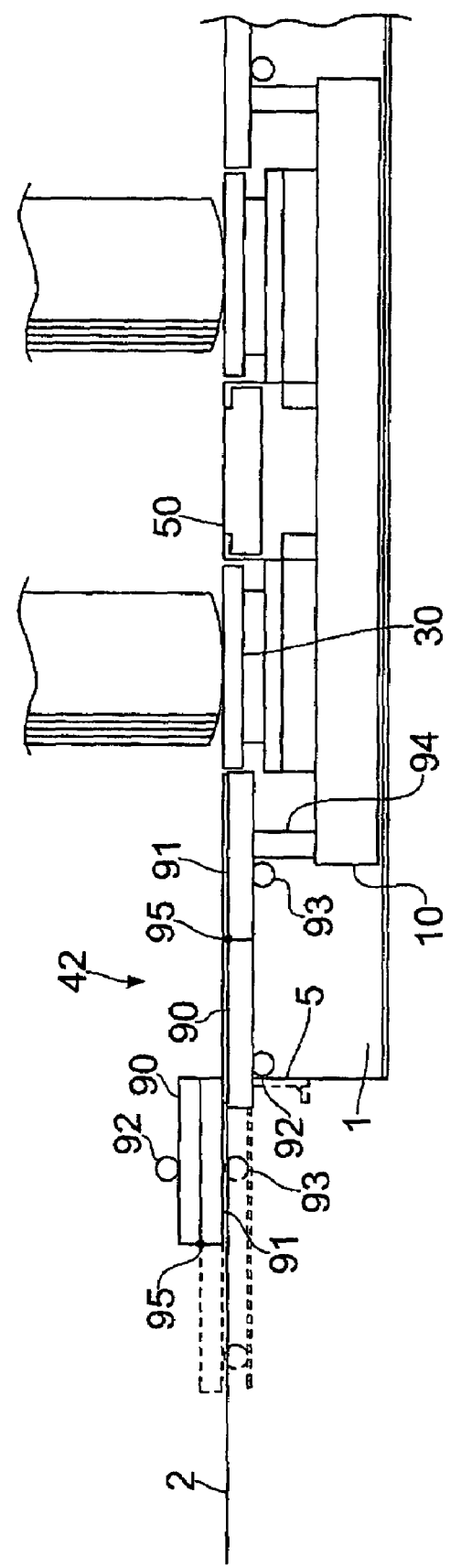
FIG. 7 is a cross-sectional view taken from the front of the calibration fixture, with a landing gear parked on the fixture.

FIG. 7 shows the left cover 42 in detail. The right cover 43 is identical. The left cover 42 comprises a pair of plates 90,91 carrying a set of wheels 92,93. The chassis 10 has a support wall 94, and when the cover is in its closed position the underside of the plate 91 is supported by the wall 94, and the front edge of the plate abuts the pad 30. Thus the cover 42 can support the weight of a left-hand wheel if the wheel is misaligned and rolls over it during parking. When the aircraft has been parked, the cover 42 is retracted to its open position shown in dashed lines in FIG. 7 in a similar manner to the front and rear covers. That is, the wheels 92,93 run on tracks (not shown) which are recessed below the support surface 22 and have an angled ramp so that as the cover rods 45 are retracted, the wheels roll up the ramp to the open position.

If clearance is required between the cover 42 and an adjacent landing gear (not shown) of the aircraft, then the cover 42 can be folded as shown in FIG. 7. That is, the plates 90,91 are joined by a hinge 95, and before the cover is retracted to its open position, the plate 90 is rotated about the hinge to the folded position before the cover 42 is retracted to its folded open position (shown in solid lines in FIG. 7).

Figure 1:
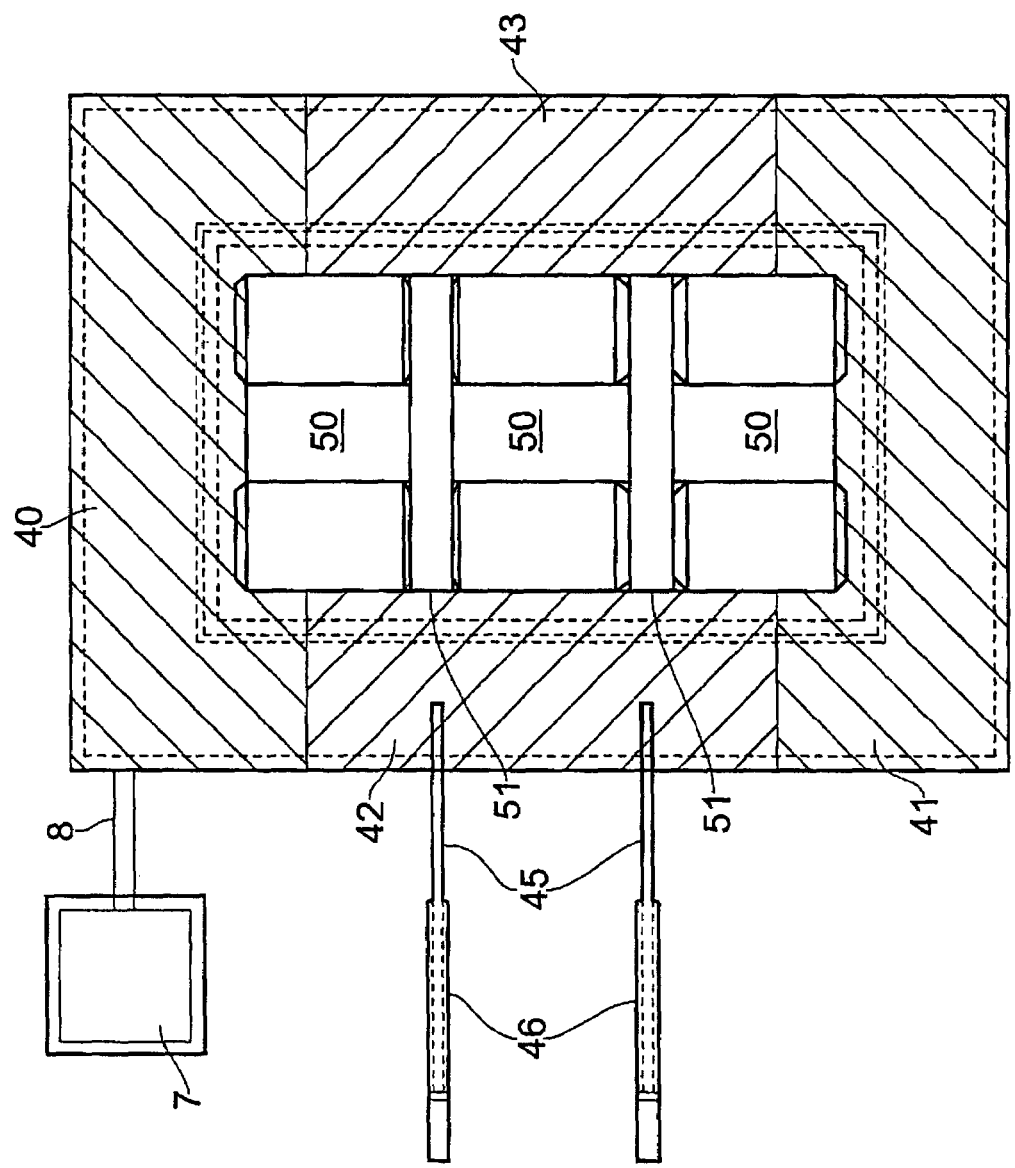
FIG. 1 is a plan view of a calibration fixture with the covers closed.

The gaps between the pads 11 are filled by removable axial blocks 50 and removable transverse blocks 51 shown in FIG. 1. Before an aircraft is parked on a fixture, the covers are closed and the blocks are inserted as shown in FIG. 1. The landing gear is then parked on the fixture as shown in FIG. 5. FIG. 5 is a view from a side of the fixture and shows three wheels 60-62 (with tires) of a six wheel landing gear mounted on an aircraft (not shown). The front wheel 60 rolls over the rear cover 41, two pads 11 and two transverse blocks 51 before parking on the front pad. Similarly, the wheel 61 rolls over the rear cover 41, the rear pad and one transverse block 51 before parking on the middle pad. Similarly, the rear wheel 62 rolls over the rear cover 41 before parking on the rear pad. The axial blocks 50 shown in FIG. 7 will not be used if the landing gear is correctly aligned: they are merely provided to bridge the gap between the pads in the event that the landing gear is not lined up correctly as it is parked on the fixture. After the landing gear has been parked as shown, the covers are retracted to their open positions shown in FIG. 2, and the blocks 50,51 are removed.

In an alternative embodiment (not shown) the two transverse blocks 51 can be replaced by four smaller transverse blocks, each lying in the transverse gap between a pair of pads and having a width equal to a width of one of the pads. The three axial blocks 51 are replaced by a single axial block running along the full length of the axial gap between the pads.

Figure 8:
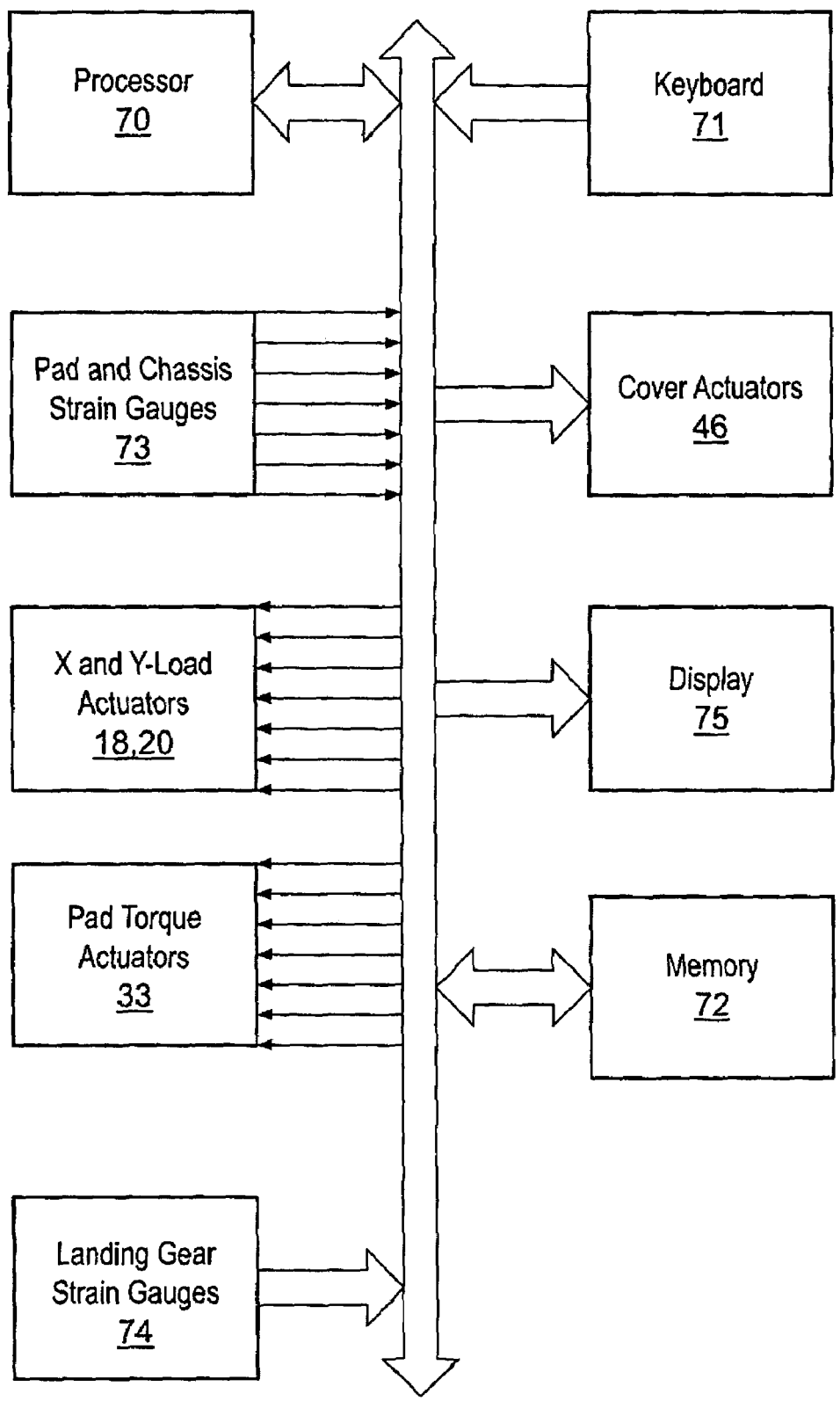
FIG. 8 is a schematic view of the electronic control system of the fixture.

FIG. 8 is a schematic view of the electronic system of the fixture coupled with a flight test installation (FTI) system on the aircraft. After the landing gear has been parked on the fixture, the electronic system of the fixture is coupled to the FTI bus shown in FIG. 8, and a processor 70 onboard the aircraft sends an electronic signal to the cover actuators 46 to retract the covers. On request from a keyboard 71, the processor 70 retrieves a loading sequence from a memory 72, which may be housed on the ground or on the aircraft. The processor 70 then sends electronic control signals to the X and Y-load actuators 18, 20 and the pad torque actuators 33 in accordance with the loading sequence. The various actuators can all be driven independently to enable any chosen combination of loads to be applied. The X and Y-load actuators 18,20 each have strain gauges 53 (shown in FIG. 3) and each linear pad actuator 33 has a strain gauge (not shown), the collection of strain gauges being indicated schematically at 73 in FIG. 8. Instead of using strain gauges, the load applied by the fixture may alternatively be measured by measuring pressure in the various hydraulic actuators. Similarly, the landing gear has a set of strain gauges indicated schematically at 74 in FIG. 8. The readings from the strain gauges 73,74 are stored in the memory 72 during the loading sequence. The strain gauge readings can then be used by the processor 70 to calculate the coefficients of a transfer function linking the load applied by the fixture with the load measured by the landing gear strain gauges 74, and to verify a mathematical model used to design the landing gear. Appropriate reports can be generated and output on a display 75. These reports form part of the aircraft certification requirements of the aircraft manufacturer.

Figure 9:
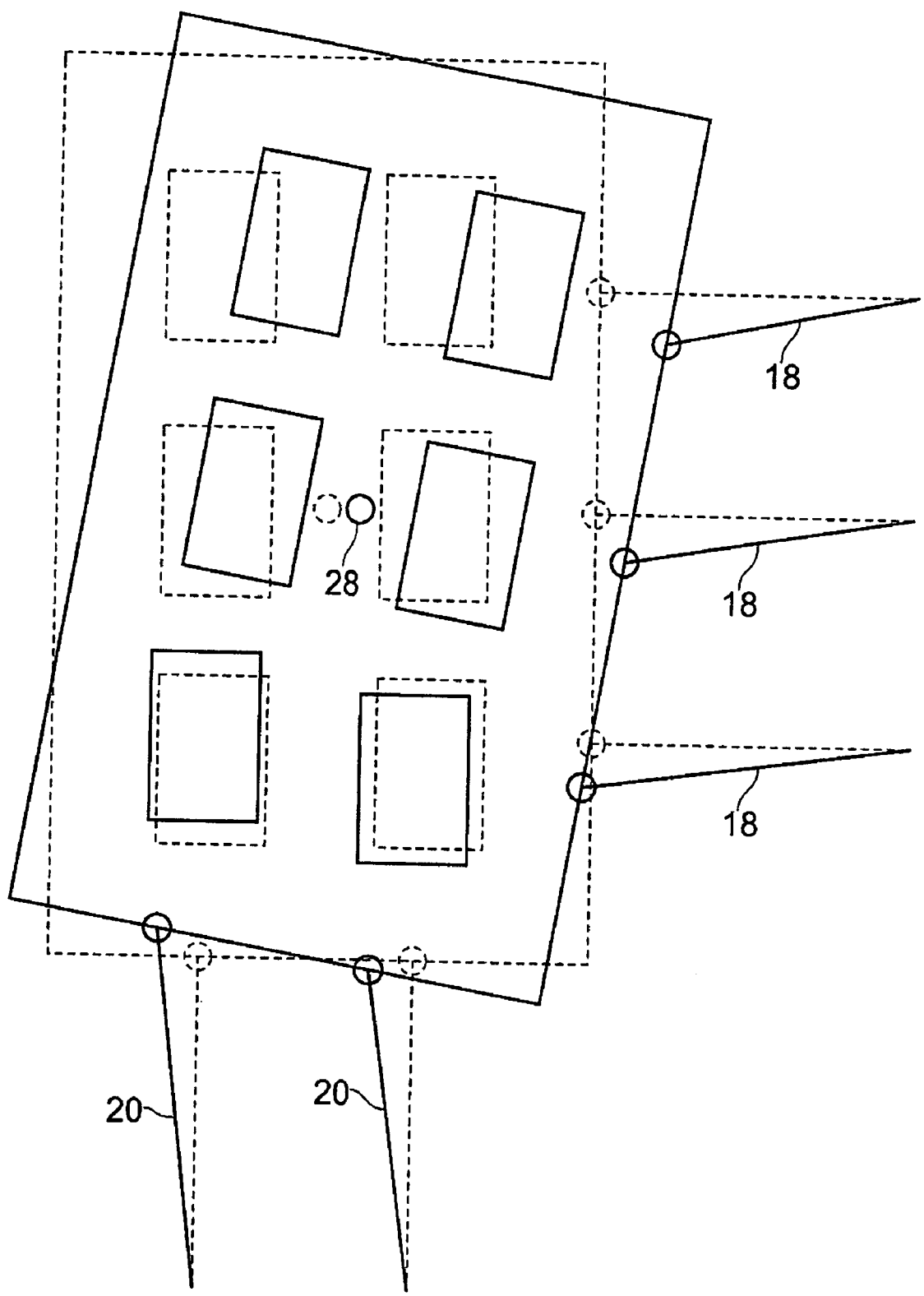
FIG. 9 shows a loading example simulating a left hand turn.

A first loading example is illustrated in FIG. 9 The pads and chassis are shown in their unloaded state in dashed lines. From the unloaded state, the X and Y-load actuators 18, 20 and the pad torque actuators 33 gradually extend or contract to move the chassis and pads towards the loaded position shown in dashed lines. This is achieved by applying preset loads to the Y-load actuators, whilst extending the X-load actuators to the position shown without applying any load. The preset loads are measured by strain gauges 53 on the end of the piston rods 17,19 shown in FIG. 3. Note that the amount of translation and rotation are exaggerated in FIG. 9 for illustrative purposes.

The loading example of FIG. 9 simulates a slow left-hand turn. As a result the chassis translates to the right and rotates about its centre (illustrated by a circle 28) in a clockwise direction. Self-aligning torque is simulated by applying clockwise torque to the front four wheels, and anticlockwise torque to the pair of rear wheels. Thus for each pad there is a component of horizontal (Y) translation so as to apply an element of linear horizontal load to the tire, and a component of rotation about a vertical (Z) axis so as to apply an element of torque to the tire. In the loading example of FIG. 9 the pads are all moved together by the chassis, as well as being moved relative to each other by their respective independently controlled torque actuation mechanisms.

In a second loading example (not shown) simulating a high speed turn, the Y-load actuators are all compressed together to apply equal amounts of linear load to the right, and an equal amount of clockwise torque is applied by each torque actuator.

In a third loading example (not shown) simulating a braking load, the X-load actuators are all expanded together to apply equal amounts of linear load towards the rear.

In a fourth loading example (not shown) simulating a slow left hand turn with pivot braking, the actuators are controlled as in FIG. 9 but with an additional component of horizontal (X) translation in the aft direction applied by the X-load actuators.

A loading sequence comprises a series of applications of a number of different loading examples, of the type described above. The load sequences apply static loads: that is, for each loading example in the loading sequence the load is gradually applied, held at a preset level for some preset time, then gradually released.

After the loading sequence, the blocks are placed between the pads, and the covers closed. The aircraft can then be driven off the fixture (either forwards or backwards) and maneuvered to park another one of the landing gears onto the same fixture. The compact form of the fixture, with all of the components recessed below the support surface 2, enables the aircraft to be maneuvered without being obstructed by actuation cables or other equipment lying on the support surface 2.

In the embodiment described above, the left and right covers 42,43 are designed with load-bearing capability so that they act as bridges if the landing gear is misaligned during parking. In an alternative embodiment (not shown) the covers may be designed without such load-bearing capability, for instance they may be formed from flexible material. In this case, the covers merely act to prevent the ingress of dust and other debris into the oil bath. Alternatively the left and right covers may be omitted entirely.

In the embodiments described above, the covers 40,41,42, 43 are opened and closed by electrically controlled hydraulic actuators, and slide in and out on tracks. In an alternative embodiment the covers may be replaced by blocks (similar to the blocks 50,51 between the pads) which are lifted out by a small crane after the aircraft has been parked on the fixture. Blocks of different sizes can be used to accommodate changes in the pitch between the pads and/or changes in the number of pads.

The embodiments described above can translate and/or rotate the chassis whilst independently applying torque to selected pads. In an alternative embodiment (not shown) a single screw jack, scissor actuator or hydraulic actuator could be fitted between the lower plate of the chassis and the upper plate of the chassis, in order to move the pads up and down and thus apply a linear vertical (Z) load to the pads. Alternatively each pad may be fitted with a respective Z-load actuator so that the wheel platforms 30 can be driven up and down independently. That is, a Z-load actuator (for instance a screw jack, scissor actuator or hydraulic actuator) is fitted between each pedestal 31 and each thrust bearing, or between each thrust bearing and each platform 30.

The embodiments described above have a single pad per wheel. In an alternative embodiment (not shown) each pad may be sized and positioned to support more than one wheel.

The embodiments described above employ hydraulic actuators to drive the covers, chassis and pads. However in alternative embodiments (not shown) some or all of the actuators may be replaced by pneumatic, electric or magnetic actuators, or any other type of actuator which can be controlled remotely by an electronic control signal from a computer.

Although the invention has been described above with reference to one or more preferred embodiments, it will be appreciated that various changes or modifications may be made without departing from the scope of the invention as defined in the appended claims.

The invention claimed is:

1. A method of applying a test load to a landing gear mounted on an aircraft, the method comprising:
   parking the aircraft with at least two tires of the landing gear on different platforms; and
   moving the platforms relative to each other so as to apply the test load to the landing gear via the tire.

2. The method of claim 1 wherein the movement of the platform includes at least a component of rotation about an axis substantially normal to the platform, so as to apply at least an element of torque to the tire.

3. The method of claim 1 wherein the movement of the platform includes at least a component of translation so as to apply at least an element of linear load to the tire.

4. The method of claim 3 wherein the movement of the platform includes at least a component of translation substantially parallel with the platform.

5. The method of claim 3 wherein the movement of the platform includes at least a component of translation substantially normal to the platform.

6. The method of claim 1 further comprising rolling one of the tires over a bridge between the different platforms; and removing the bridge.

7. The method of claim 1 further comprising moving a support member which carries the different platforms, so as to move the platforms together.

8. The method of claim 1 further comprising moving the platforms relative to each other when no aircraft is parked on the platforms, so as to vary the spacing between the platforms.

9. The method of claim 1 further comprising removing at least one of the platforms so as to vary the number of platforms.

10. The method of claim 1 further comprising measuring and recording a load in the platform(s).

11. The method of claim 1 further comprising storing a loading sequence; and moving the platform(s) in accordance with the loading sequence.

12. The method of claim 1 further comprising sending an electronic control signal to a platform actuator so as to cause the platform actuator to move the platform.

13. The method of claim 1 wherein the platform is housed in a recess of a support surface, and wherein the tire is parked on the platform by rolling the tire from the support surface onto the platform.

14. The method of claim 1 wherein the aircraft is parked onto the platform by rolling the tire from a support surface onto the platform, and wherein the platform is moved by a platform actuator which is housed in a recess in the support surface.

15. The method of claim 1 wherein after the platform has been moved it is held substantially stationary so as to apply a substantially static test load to the tire.

16. Apparatus for applying a test load to a landing gear mounted on an aircraft, the apparatus comprising:
   at least two platforms for engaging one or more tires of the landing gear; and each of said platforms having a platform actuators for moving its respective platform relative to another platform so as to apply the test load to the landing gear via the tire.

17. The apparatus of claim 16 wherein at least one of the platform actuators is a hydraulic actuator.

18. The apparatus of claim 16 wherein at least one of the platform actuators is a torque actuator which is configured to rotate the platform about an axis normal to the platform.

19. The apparatus of claim 18 wherein the torque actuator comprises a pair of linear actuators which are located on opposite sides of the axis and configured to apply load to the platform in opposite directions.

20. The apparatus of claim 16 wherein at least one of the platform actuators is a linear actuator which is configured to translate the platform.

21. The apparatus of claim 16 wherein each platform actuator is operable independently of the other platform actuator(s).

22. The apparatus of claim 16 further comprising one or more removable bridges positioned between the platforms.

23. The apparatus of claim 16 further comprising a support member which carries the two or more platforms; and one or more main actuators for moving the support member.

24. The apparatus of claim 23 wherein at least one of the main actuators is a hydraulic actuator.

25. The apparatus of claim 23 wherein at least one of the main actuators is configured to translate the support member in a plane substantially parallel with the platforms.

26. The apparatus of claim 16 wherein at least one of the platforms can be removed when no aircraft is parked on the platforms, so as to vary the number of platforms.

27. The apparatus of claim 16 further comprising a load sensor for measuring load in the platform.

28. The apparatus of claim 16 wherein at least one of the platform actuators is housed in a recess of a support surface.

29. The apparatus of claim 16 wherein at least one of the platform actuators is connected to an underside of a platform.

30. A method of applying a test load to a landing gear mounted on an aircraft, the method comprising:
    parking the aircraft with at least one tire of the landing gear on a platform;
    moving the platform so as to apply the test load to the landing gear via the tire;
    storing a loading sequence; and
    moving the platform(s) in accordance with the loading sequence.

* * * * *